(12) United States Patent
Pimpinella et al.

(10) Patent No.: US 7,121,732 B2
(45) Date of Patent: Oct. 17, 2006

(54) COLLET ASSEMBLY WITH RIBBON FIBER HOLDER

(75) Inventors: Richard Pimpinella, Frankfort, IL (US); William F. McAvoy, DesPlaines, IL (US); Edward F. Kirn, Tinley Park, IL (US)

(73) Assignee: Panduit Corp., Tinley Park, IL (US)

( * ) Notice: Subject to any disclaimer, the term of this patent is extended or adjusted under 35 U.S.C. 154(b) by 24 days.

(21) Appl. No.: 10/972,608

(22) Filed: Oct. 25, 2004

(65) Prior Publication Data

US 2006/0088250 A1    Apr. 27, 2006

(51) Int. Cl.
*G02B 6/36* (2006.01)
(52) U.S. Cl. ..................................... 385/53
(58) Field of Classification Search .............. 385/53, 385/56, 78, 87; 439/583, 584
See application file for complete search history.

(56) References Cited

U.S. PATENT DOCUMENTS

| | | | |
|---|---|---|---|
| 4,447,107 A | 5/1984 | Major, Jr. | |
| 4,606,596 A | 8/1986 | Whiting et al. | |
| 4,854,893 A | 8/1989 | Morris | |
| 4,923,412 A | 5/1990 | Morris | |
| 4,964,685 A | 10/1990 | Savitsky et al. | |
| 5,062,683 A | 11/1991 | Grois et al. | |
| 5,074,636 A | 12/1991 | Hopper | |
| 5,181,272 A | 1/1993 | Hopper | |
| 5,271,080 A | 12/1993 | Hopper et al. | |
| 5,402,512 A | 3/1995 | Jennings et al. | |
| 5,471,555 A | 11/1995 | Braga et al. | |
| 5,785,554 A * | 7/1998 | Ohshiro | 439/584 |
| 6,234,684 B1 * | 5/2001 | Kawamura et al. | 385/78 |
| 6,434,315 B1 | 8/2002 | Grois et al. | |
| 6,434,316 B1 | 8/2002 | Grois et al. | |
| 6,439,780 B1 | 8/2002 | Mudd et al. | |
| 6,571,048 B1 | 5/2003 | Bechamps et al. | |
| 6,623,173 B1 | 9/2003 | Grois et al. | |
| 2002/0164130 A1 * | 11/2002 | Elkins et al. | 385/87 |

\* cited by examiner

*Primary Examiner*—Chau N. Nguyen
(74) *Attorney, Agent, or Firm*—Robert A. McCann; Aimee E. McVady

(57) ABSTRACT

A breakout device that separates and protects individual fibers from a ribbon fiber cable. The breakout device includes a collet assembly that secures the ribbon fiber cable in the device. The collet assembly includes a base having a tapered internal bore, a collet positioned within the internal bore and a nut positioned over the base. The collet includes an aperture that receives the ribbon fiber cable and fingers that retain the ribbon fiber cable in the collet. When the nut is tightened over the base, the nut forces the collet further into the base thereby compressing the fingers axially along the cable.

12 Claims, 4 Drawing Sheets

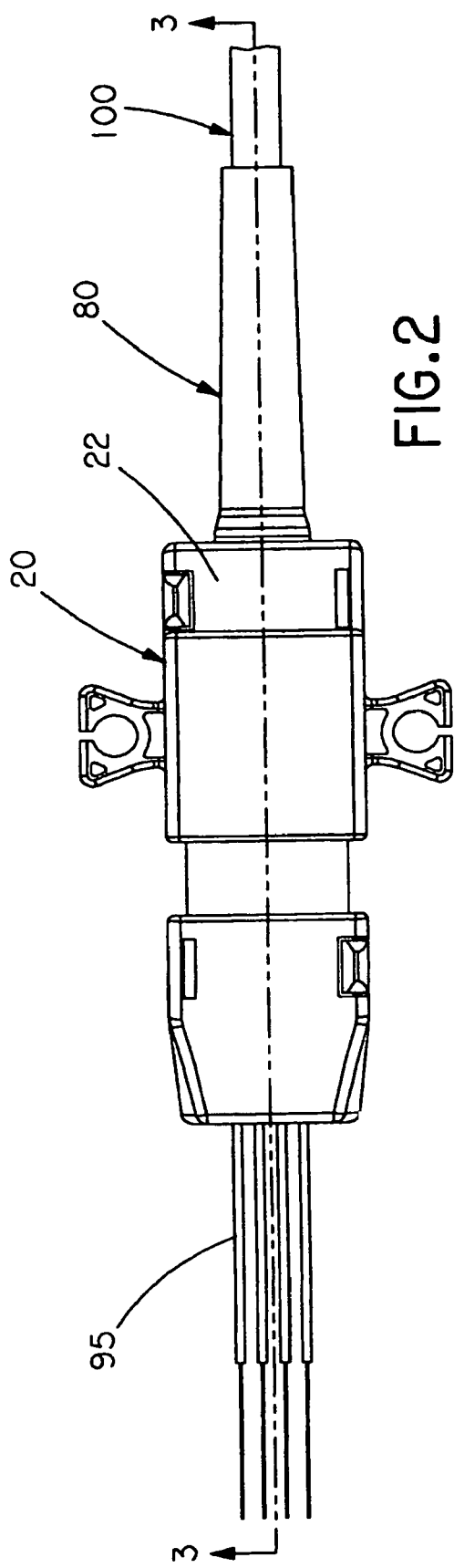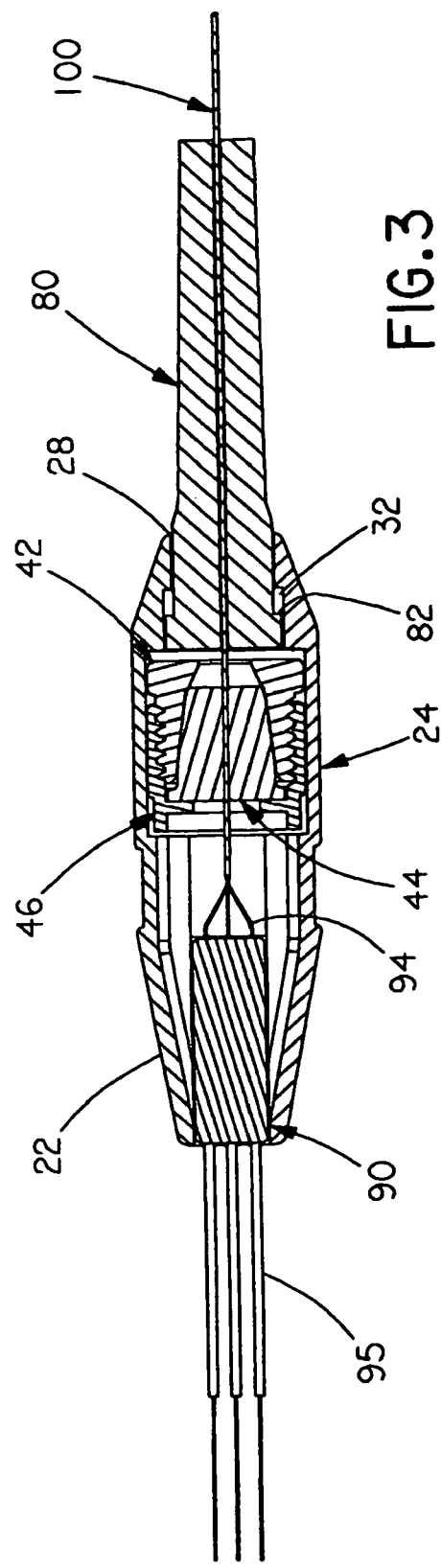

COLLET ASSEMBLY WITH RIBBON FIBER HOLDER

FIELD OF THE INVENTION

The present invention relates to a breakout device for a fiber optic ribbon cable, and more particularly to a breakout device having a collet assembly with a holder for a fiber optic ribbon cable.

BACKGROUND OF THE INVENTION

It is known to use breakout kits or devices to protect fiber optic ribbon cables that have been separated into individual fibers. A metal clip is often used to retain the fiber optic ribbon cable within the device. The metal retaining clips, however, have a tendency to bundle up the ribbon cable causing micro-bends in the cable. The micro-bends affect the performance of the fiber optic networks by causing increased measured losses at long wavelengths. Alternatively, heat shrink tubing has been used to retain the fiber optic ribbon cable. The heat shrink tubing also has a tendency to bundle up the ribbon cable thereby causing micro-bends in the cable. Therefore, it is desirable to provide a breakout device that uniformly retains the cable in the device without causing micro-bends in the cable thereby improving performance of the fiber optic network.

SUMMARY OF THE INVENTION

The present invention is directed to a breakout device that separates and protects individual fibers from a ribbon fiber cable. The breakout device houses a collet assembly that secures the ribbon fiber cable and a tube holder that holds the individual fibers of the ribbon fiber cable. The collet assembly includes a base with a tapered internal bore, a collet positioned within the internal bore of the base and a nut that secures the collet within the base. The collet has an aperture for receiving the ribbon fiber cable and fingers for retaining the ribbon fiber cable in the base. The nut is positioned over the base such that as the nut is tightened, the nut forces the collet further into the base thereby compressing the fingers axially along the ribbon cable.

BRIEF DESCRIPTION OF THE DRAWINGS

FIG. 2 illustrates a top view of the assembled breakout device with the collet assembly for the ribbon fiber cable illustrated in FIG. 1;

FIG. 3 illustrates a cross-sectional view of the assembled breakout device with the collet assembly taken along line 3—3 in FIG. 2;

DETAILED DESCRIPTION

Figure 1:
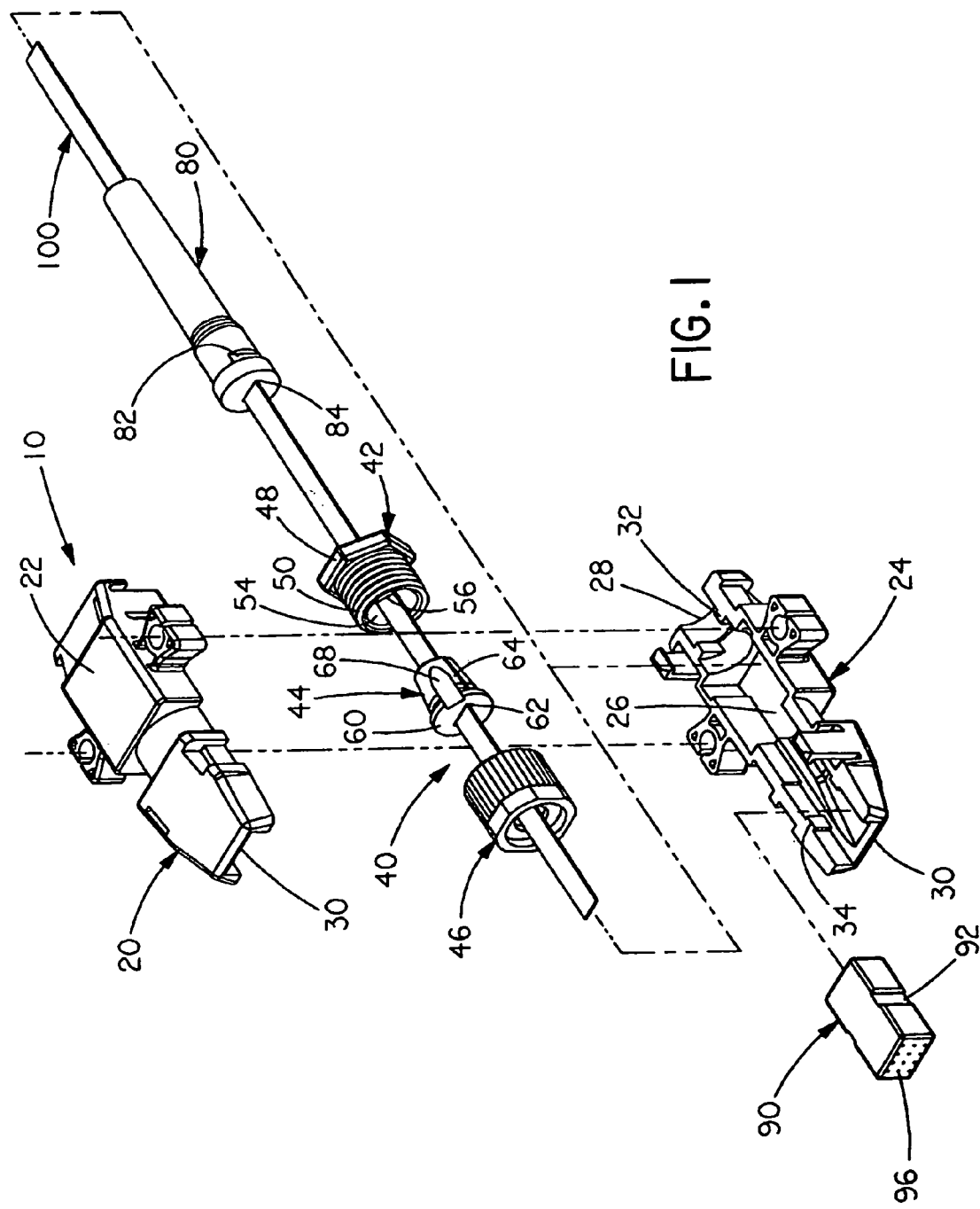
FIG. 1 illustrates an exploded perspective view of a breakout device with a collet assembly for a ribbon fiber cable.

As illustrated in FIGS. 1–3, a breakout device for protecting and separating a ribbon fiber cable into individual fibers is illustrated in general at 10. The breakout device 10 includes an external housing 20, a collet assembly 40, a boot 80 for a ribbon fiber cable 100 and a fiber tube holder 90. The external housing 20 is formed from an upper housing half 22 and a lower housing half 24. When assembled, the upper housing half 22 and the lower housing half 24 define a cavity 26 therebetween for positioning the collet assembly 40, the boot 80 for the ribbon fiber cable and the fiber tube holder 90 within the housing 20. The upper housing half 22 and the lower housing half 24 also include internal ribs 32, 34 for securing the boot 80 and the fiber tube holder 90, respectively, in the housing 20. As illustrated in FIG. 1, the internal ribs 32, 34 extend the width of the housing 20. As will be discussed below, the boot 80 and the fiber tube holder 90 each includes slots 82, 92, respectively, designed to receive the internal ribs 32, 34 to align and secure the boot 80 and the fiber tube holder 90 in the housing 20. Thus in the assembled breakout device, illustrated in FIGS. 2 and 3, the boot 80 extends outwardly from a first end 28 of the housing 20 and the fiber tube holder 90 is disposed within the housing at a second end 30 of the housing 20.

Figure 4:
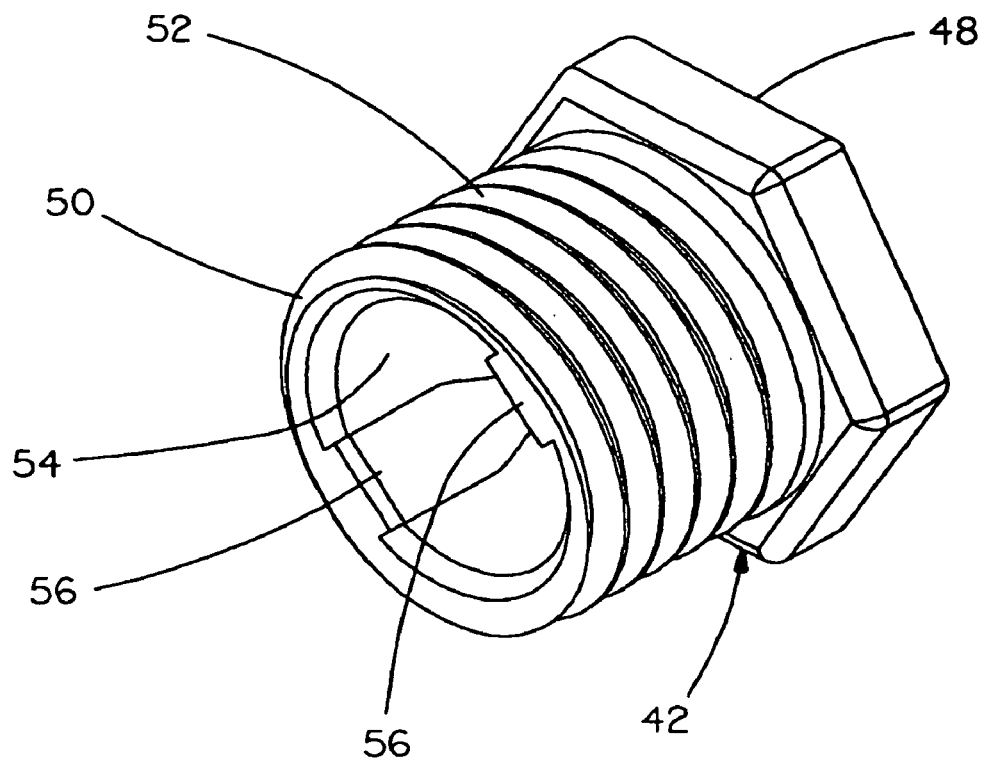
FIG. 4 illustrates a perspective view of the compression base of the collet assembly illustrated in FIG. 1.

The collet assembly 40 includes a compression base 42, a collet 44 and a compression nut 46. As illustrated in FIG. 4, the compression base 42 is cylindrical with a first end 48 and a second end 50. The cylindrical base includes a threaded external surface 52 and a tapered internal bore 54. The first end 48 of the compression base 42 has a hexagonal shape. The hexagonal end enables a technician in the field to easily tighten the compression base 42 by hand or by a wrench, if desired.

Opposite the first end 48, the second end 50 of the compression base 42 has a circular opening that leads to the tapered internal bore 54. The internal bore 54 includes two protrusions 56 or keys positioned 180 degrees from each other. The keys 56 extend inwardly towards the center of the internal bore 54.

Figure 5:
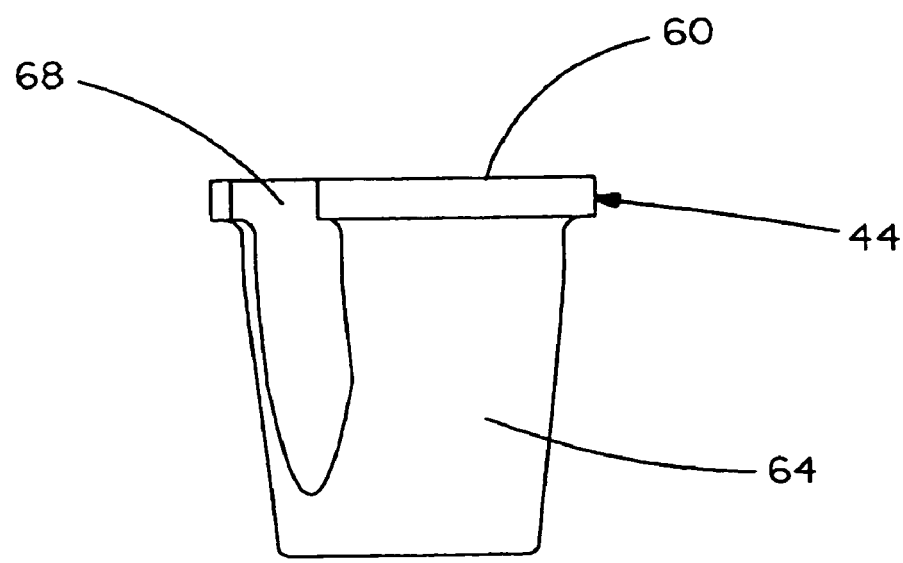
FIG. 5 illustrates a side view of the collet of the collet assembly for holding the ribbon fiber cable illustrated in FIG. 1.
Figure 6:
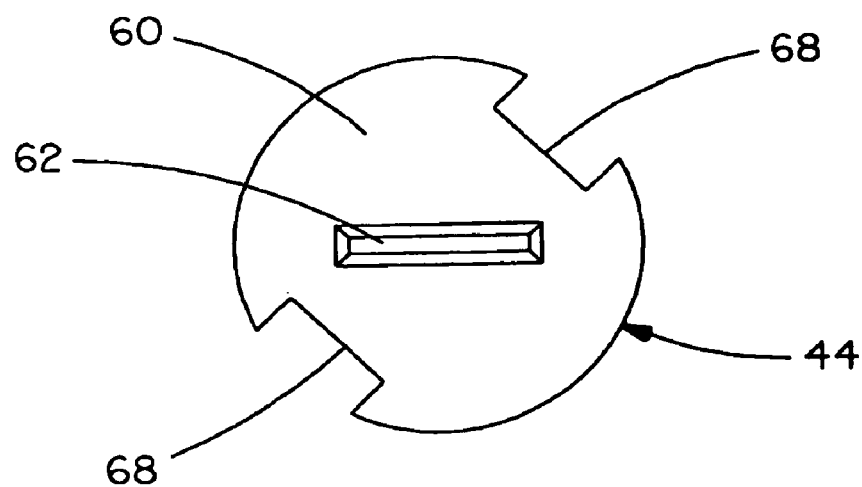
FIG. 6 illustrates a front view of the collet illustrated in FIG. 5.

FIGS. 5 and 6 illustrate the collet 44 for holding the ribbon fiber optic cable. The collet 44 prevents the ribbon cable from being removed from the assembly by axially retaining the ribbon cable. The collet 44 includes a flat head 60 with an aperture 62 that is configured to receive the ribbon cable. The aperture 62 is positioned at the center of the flat head 60. The aperture 62 is preferably rectangular, however, it is contemplated that the aperture may be formed from a variety of shapes. The aperture 62 enables the collet 44 to maintain the ribbon fiber cable 100 in a flat orientation.

Two fingers 64 extend from the flat head 60 to form the body of the collet. The outer profile of the fingers 64 is tapered such that the outer profile of the fingers corresponds to the tapered internal bore 54 of the compression base 42. As the collet 44 is inserted into the compression base 42, the tapered internal bore 54 of the compression base 42 forces the tapered fingers 64 of the collet 44 to collapse around the ribbon cable 100 positioned within the collet.

The outer surface of each finger 64 of the collet 44 includes a slot 68. The slots 68 are positioned 180 degrees from each other. The slots 68 are designed to receive the keys 56 that extend into the internal bore 54 of the compression base 42. It is contemplated that the slots and the keys may be formed from various shapes as long as the keys and slots are able to matingly engage each other. The slots 68 orient and align the collet 44 as it is installed in the compression base 42. Thus, when the collet 44 is positioned in the compression base 42, the keys 56 are disposed in the slots 68 to prevent the collet 44 from turning in the compression base 42 while the collet 44 is being compressed in the base 42.

The collet is manufactured from an elastomeric material, such as a thermoplastic elastomer. The elastomeric material provides friction to the incoming cable. The elastomeric material also reduces the potential that the ribbon fiber cable would be crushed if the collet is over tightened.

Figure 7:
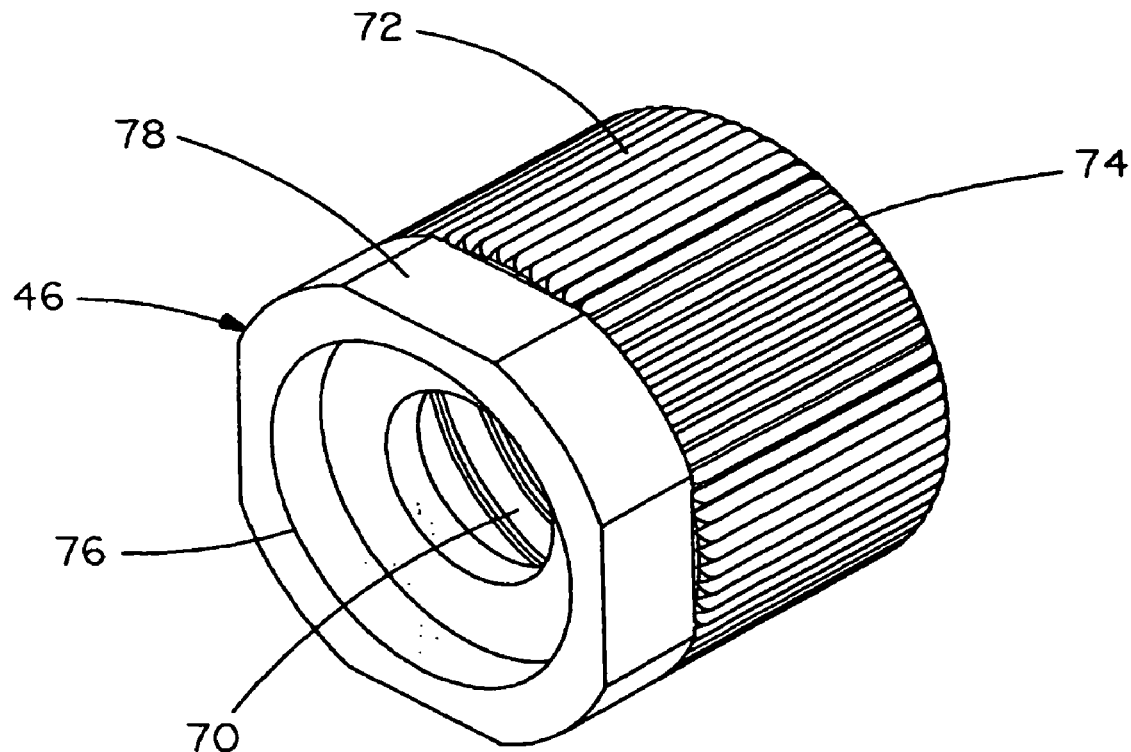
FIG. 7 illustrates a perspective view of the compression nut of the collet assembly illustrated in FIG. 1.

FIG. 7 illustrates the compression nut 46 of the collet assembly 40. The inner surface 70 of the compression nut 46 has internal threads for engaging the external surface 52 of the compression base 42. The outer surface 72 of the compression nut 46 is knurled to provide a gripping surface so that the technician may easily tighten the compression nut by hand. The compression nut 46 also includes a first end 74 and a second end 76. The first end 74 of the compression nut has a circular opening for receiving the collet and the compression base to form the collet assembly. The second end 76 of the compression nut 46 includes four flat surfaces 78 for enabling the technician to tighten the compression nut with a wrench, if desired.

The compression nut 46 is designed to capture and secure the collet 44 within the compression base 42 to form the collet assembly 40. As the compression nut 46 is installed on the compression base 42, the collet 44 is forced further into the internal bore 54 of the compression base 42. As a result, the fingers 64 collapse axially along the ribbon cable 100. The fingers 64 retain the ribbon cable 100 longitudinally thereby preventing the cable from bundling up in the collet assembly 40.

As shown in FIGS. 1–3, the strain relief boot 80 used in the breakout device includes a rectangular opening 84 for enabling the boot 80 to slide over the exterior of the ribbon cable to control the bend in the cable. The boot 80 also includes two identical slots 82 located on opposite sides of the boot 80. The slots 82 enable the boot 80 to be captured and securely held by the internal ribs 32 in the upper and lower halves 22, 24 of the housing 20 when the housing is assembled. The slots 82 prevent the boot from rotating which can cause the ribbon cable to twist resulting in micro-bending and mechanical stress. Additionally, when the boot is disposed in the assembled housing, it extends beyond the housing to provide strain relief for the ribbon cable.

As shown in FIGS. 1–3, the tube holder 90 is used to secure the individual fibers extending from the ribbon cable. The tube holder 90 includes an entrance 94 (see FIG. 3), build-up tubing 95 and exit holes 96 for accommodating the individual fibers exiting the device. The tube holder 90 includes slots 92 that receive the internal ribs 34 in the upper and lower halves 22, 24 of the housing 20 when the breakout device is assembled. When the ribs 34 are positioned in the slots 92 of the tuber holder 90, the tube holder 90 and the fibers disposed therein are prevented from being dislodged from the housing 20.

To assemble the breakout device, the boot 80 is slid over the ribbon cable 100. Next the compression base 42 and the collet 44 are slid over the ribbon cable 100. The slots 68 in the collet 44 are aligned with the keys 56 disposed in the internal bore 54 of the compression base 42 and the collet 44 is inserted in the compression base 42. The compression nut 46 is slid over the ribbon cable and threaded onto the compression base 42. The compression nut 46 is hand-tighten onto the compression base 42. As the compression nut 46 is tighten, the collet 44 is forced into the compression base 42 and the tapered fingers 64 of the collet 44 are compressed onto the ribbon cable. If hand tightening the compression nut 46 does not compress the collet 44 enough to prevent the cable from sliding, the compression nut 46 may be further tightening by an adjustable wrench or an open-end wrench.

Next, a portion of the matrix coating is removed from the ribbon cable so that the individual fibers may be separated. Preferably approximately 30" of the matrix coating is removed. The individual optic fibers are carefully feed through the build-up tubing of the tube holder. The boot 80, collet assembly 40 and tube holder 90 may now be placed into the lower half 24 of the housing 20. The boot 80 and the tube holder 90 are positioned such the internal ribs 32, 34 in the housing are aligned with the slots 82, 92 in the boot 80 and the tube holder 90, respectively. Finally, the upper half 22 of the housing 20 is snapped on to the lower half 24 of the housing 20 to complete the breakout device.

The breakout device of the present invention provides a collet assembly with a tapered collet that retains a ribbon cable by collapsing onto the ribbon cable axially instead of perpendicularly. As a result, when the tapered collet is compressed, the pressure from the collet fingers is uniformly transferred along the surface of the ribbon cable that is parallel to the collet fingers to retain the ribbon cable in the device.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A collet assembly for securing a ribbon fiber cable, the collet assembly comprising:
    a base having a tapered internal bore;
    a collet positioned within the internal bore of the base, the collet having an aperture for receiving the ribbon fiber cable and fingers for retaining the ribbon fiber cable;
    the internal bore of the base includes at least one key and the collet includes at least one slot, when the collet is positioned in the internal bore of the base, the at least one slot receives the at least one key for preventing the collet from rotating in the base; and
    a nut for securing the collet within the base,
    whereby as the nut is tightened over the base, the nut forces the collet further into the base thereby compressing the fingers axially along the ribbon fiber cable.

2. The collet assembly of claim 1, wherein the collet is formed from an elastomeric material.

3. The collet assembly of claim 1, wherein the aperture in the collet is rectangular.

4. The collet assembly of claim 1, wherein the fingers of the collet have a tapered profile that corresponds to the tapered internal bore of the base.

5. A breakout device for a ribbon fiber cable, the breakout device comprising:
    a housing having an upper half and a lower half;
    a collet assembly disposed within the housing, the collet assembly having a base with a tapered internal bore; a collet positioned within the internal bore of the base, the collet having an aperture for receiving the ribbon fiber cable and fingers for retaining the ribbon fiber cable; and a nut for securing the collet within the base, whereby as the nut is tightened over the base, the nut forces the collet further into the base thereby compressing the fingers axially along the ribbon fiber cable.

6. The breakout device of claim 5 further comprising:
a boot disposed within the housing and positioned adjacent to the collet assembly for controlling the ribbon fiber cable; and
a tube holder disposed within the housing and positioned adjacent the collet assembly opposite the boot for holding individuals fibers from the ribbon fiber cable.

7. The breakout device of claim 5, wherein the collet is formed from an elastomeric material.

8. The breakout device of claim 5, wherein the aperture in the collet is rectangular.

9. The breakout device of claim 5, wherein the fingers of the collet have a tapered profile that corresponds to the tapered internal bore of the base.

10. The breakout device of claim 5, wherein the internal bore of the compression base includes at least one key and the collet includes at least one slot, whereby when the collet is positioned in the internal bore of the compression base, the at least one slot receives the at least one key for preventing the collet from rotating in the compression base.

11. The breakout device of claim 6, wherein the upper half and the lower half of the housing have ribs and the boot and the tube holder include slots, wherein the slots in the boot and tube holder are configured to receive the ribs in the upper and lower halves of the housing to secure the boot and the tube holder in the housing.

12. The breakout device of claim 6, wherein the boot has a rectangular opening to receive the ribbon fiber cable therethrough.

* * * * *